(12) United States Patent
Moretti et al.

(10) Patent No.: US 10,311,741 B2
(45) Date of Patent: Jun. 4, 2019

(54) DATA EXTRACTION AND ANALYSIS SYSTEM AND TOOL

(71) Applicant: Pearson Education, Inc., New York, NY (US)

(72) Inventors: Antonio Moretti, Centennial, CO (US); Kathy McKnight, Centennial, CO (US); José Pablo González Brenes, San Diego, CA (US)

(73) Assignee: Pearson Education, Inc., Bloomington, MN (US)

( * ) Notice: Subject to any disclaimer, the term of this patent is extended or adjusted under 35 U.S.C. 154(b) by 911 days.

(21) Appl. No.: 14/791,167

(22) Filed: Jul. 2, 2015

(65) Prior Publication Data

US 2017/0004415 A1    Jan. 5, 2017

(51) Int. Cl.
| | |
|---|---|
| *G06N 99/00* | (2019.01) |
| *G06F 17/30* | (2006.01) |
| *G09B 5/00* | (2006.01) |
| *G06Q 50/20* | (2012.01) |
| *G09B 7/00* | (2006.01) |

(52) U.S. Cl.
CPC .............. *G09B 5/00* (2013.01); *G06Q 50/20* (2013.01); *G09B 7/00* (2013.01)

(58) Field of Classification Search
CPC ... G09B 5/08; G09B 5/12; G09B 5/10; G06N 99/005; G06Q 50/20
See application file for complete search history.

(56) References Cited

U.S. PATENT DOCUMENTS

| | | | | |
|---|---|---|---|---|
| 2004/0030667 | A1* | 2/2004 | Xu ..................... | G06K 9/6217 |
| 2009/0276390 | A1* | 11/2009 | Watanabe ............... | G06F 17/18 |
| | | | | 706/54 |
| 2014/0351269 | A1* | 11/2014 | Kapoor .................... | G09B 7/00 |
| | | | | 707/748 |
| 2015/0079575 | A1* | 3/2015 | Couch ..................... | G09B 5/02 |
| | | | | 434/350 |
| 2016/0180248 | A1* | 6/2016 | Regan ..................... | G06F 17/30 |
| | | | | 706/12 |

OTHER PUBLICATIONS

Partitioning variation across levels, University of Bristol Centre for Multilevel Modelling, 2011.*

* cited by examiner

*Primary Examiner* — Usmaan Saeed
*Assistant Examiner* — William P Bartlett
(74) *Attorney, Agent, or Firm* — Quarles & Brady LLP

(57) ABSTRACT

A data extraction and analysis system and tool is disclosed herein. The data extraction and analysis system and tool can include memory containing a comparison database, a factor database, and a model database that can include a multilevel model. The data extraction and analysis system and tool can include a content management server. The content management server can receive a request identifying a species and a variable and can retrieve data to generate a statistical model. Based on the statistical model, the content management server can identify and recommend an option to the requestor.

13 Claims, 9 Drawing Sheets

DATA EXTRACTION AND ANALYSIS SYSTEM AND TOOL

BACKGROUND

This disclosure relates to machine learning. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning can provide useful tools in many situations. However, many aspects of machine learning have not as yet been adequately developed such that machine learning is broadly useable. Accordingly, new machine learning systems, methods, and tools are desired.

BRIEF SUMMARY

One aspect of the present disclosure relates to a data extraction system. The data extraction system includes a database server having a comparison database including data ranking options based on a comparison of statistical models, a factor database, and a model database that includes a multilevel model. The data extraction system can include a content management server that can be controlled by software to receive a request for a recommendation from a user device, which request for a recommendation includes data identifying a category and a variable, identify a plurality of species data sources, which species data sources include at least a first website hosted by a first content server and a second website hosted by a second content server, and retrieve species content from the species data sources. The content management server can be controlled by software to identify a plurality of potential qualitative data sources, which potential qualitative data sources include at least a third website hosted on a third content server, retrieve the potential qualitative data from the potential qualitative data sources, generate a statistical model based on the species content and the potential qualitative data, and provide a recommendation based on the statistical model.

In some embodiments, the statistical model can be a multilevel model. In some embodiments, retrieving the species content can include receiving format information, which format information identifies the format in which the species content is contained in the species data source, and identifying at least one relevant field in the species data of the species data source.

In some embodiments, retrieving the species data further includes scraping the species content from the at least one identified relevant field in the species data. In some embodiments, scraping the species content includes web scraping. In some embodiments, retrieving the potential qualitative data includes receiving format information, which format information identifies the format in which the potential qualitative data is contained in the potential qualitative data source, identifying at least one relevant field of the potential qualitative data source, and scraping the potential qualitative data from the at least one identified relevant field of the potential qualitative data source.

In some embodiments, the content management server can be controlled by software to extract qualitative data information from the retrieved potential qualitative data. In some embodiments, extracting qualitative data information from the retrieved potential qualitative data includes identifying ranking variables, which ranking variables are stored within the model database, identifying the qualitative data, generating ranking data corresponding to the ranking variables based on the qualitative data, and storing the ranking data.

In some embodiments, generating the statistical model includes identifying levels within the base content and the qualitative data, estimating level variance, which level variances includes the percentage of variation in an aggregate of the base content and the qualitative data attributable to each of the levels, generating a simplified statistical model, which simplified statistical model is based on less than all of the identified levels, and calculating an error. In some embodiments, generating the statistical model includes generating a second statistical model, which second statistical model is based on at least one more of the identified levels than the simplified statistical model, comparing the simplified statistical model to the second statistical model, and selecting the most accurate of the simplified statistical model and the second statistical model. In some embodiments, the level variance is calculated as one of the variance partition coefficient (VPC) and the intraclass correlation coefficient (ICC). In some embodiments, the most accurate of the simplified statistical model and the second statistical model is selected according to at least one of a Chi-squared likelihood ratio test, an Akaike information criterion (AIC), and a Bayesian information criterion (BIC).

One aspect of the present disclosure relates to a method of data extraction and analysis. The method includes receiving a request for a recommendation from a user device, which request for a recommendation includes data identifying a category and a variable, identifying a plurality of species data sources, which species data sources includes at least a first website hosted by a first content server and a second website hosted by a second content server, and which identified plurality of species data sources have a category matching the category of the received request, and retrieving species content from the species data sources. In some embodiments the method can include identifying a plurality of potential qualitative data sources, which potential qualitative data sources include at least a third website hosted on a third content server, retrieving the potential qualitative data from the potential qualitative data sources, generating a statistical model based on the species content and the potential qualitative data, and providing a recommendation based on the statistical model, which recommendation identifies an action in regards to the variable of the received request.

In some embodiments, the statistical model can be a multilevel model. In some embodiments, retrieving the species content can include receiving format information, which format information identifies the format in which the species content is contained in the species data source, identifying at least one relevant field in the species data of the species data source, and scraping the species content from the at least one identified relevant field in the species data. In some embodiments, retrieving the potential qualitative data can include receiving format information, which format information identifies the format in which the potential qualitative data is contained in the potential qualitative data source, identifying at least one relevant field of the potential qualitative data source, and scraping the potential qualitative data from the at least one identified relevant field of the potential qualitative data source.

In some embodiments, the method can include extracting qualitative data information from the retrieved potential qualitative data. In some embodiments, extracting qualitative data information from the retrieved potential qualitative data can include identifying ranking variables, which ranking variables can be stored within the model database, identifying the qualitative data, generating ranking data corresponding to the ranking variables based on the qualitative data, storing the ranking data, identifying levels within the base content and the qualitative data, estimating level variance, which level variances can be the percentage of variation in an aggregate of the base content and the qualitative data attributable to each of the levels, generating a simplified statistical model, which simplified statistical model is based on less than all of the identified levels, and calculating an error.

In some embodiments, generating the statistical model can include generating a second statistical model, which second statistical model is based on at least one more of the identified levels than the simplified statistical model, comparing the simplified statistical model to the second statistical model, and selecting the most accurate of the simplified statistical model and the second statistical model. In some embodiments, the level variance is calculated as one of the variance partition coefficient (VPC) and the intraclass correlation coefficient (ICC), and in some embodiments, the most accurate of the simplified statistical model and the second statistical model is selected according to at least one of a Chi-squared likelihood ratio test, an Akaike information criterion (AIC), and a Bayesian information criterion (BIC).

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
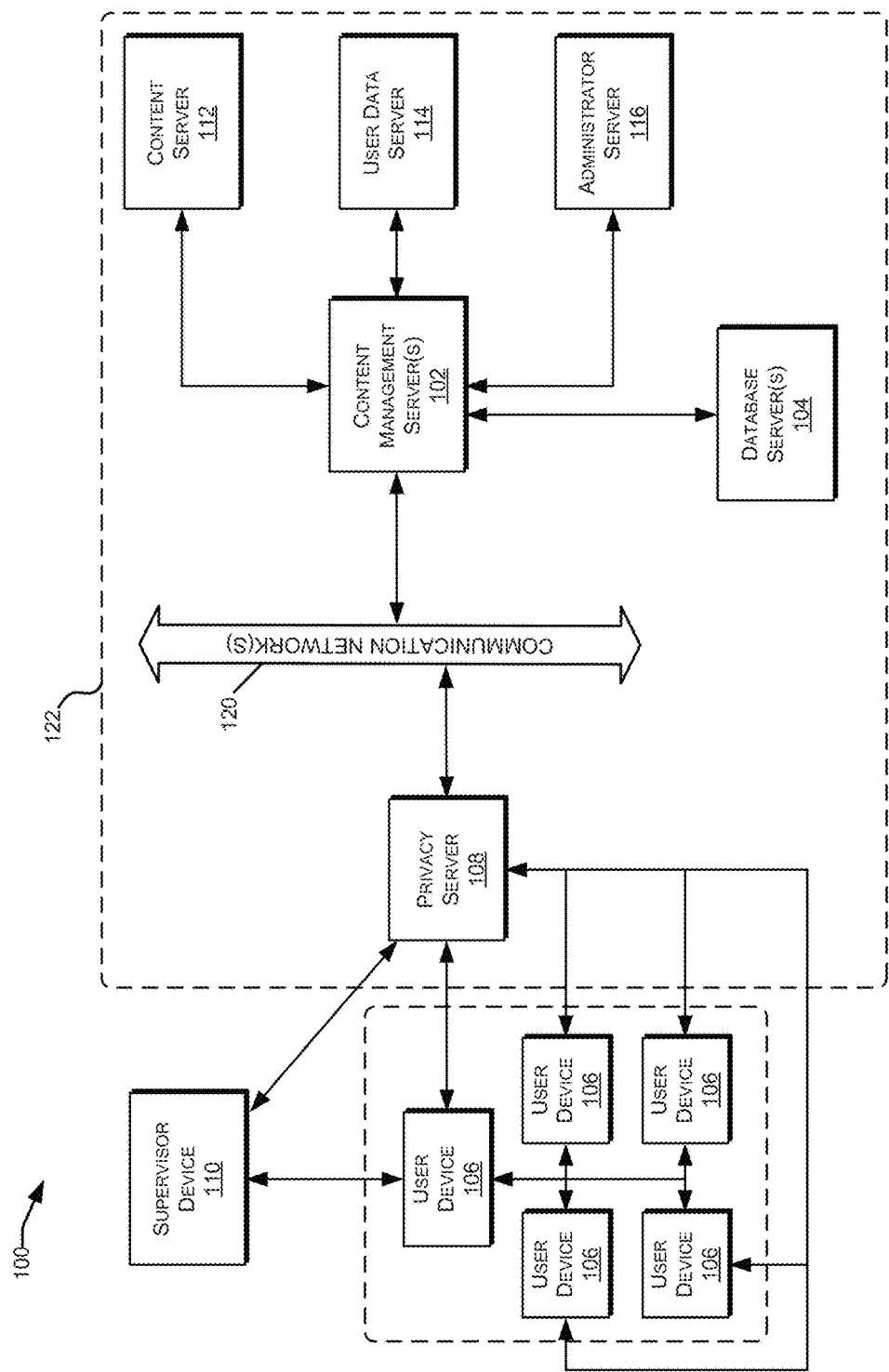
FIG. 1 is a block diagram showing illustrating an example of a data extraction and analysis system.

With reference now to FIG. 1, a block diagram is shown illustrating various components of a data extraction and analysis system 100 which implements and supports certain embodiments and features described herein. The data extraction and analysis system 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The data extraction and analysis system 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the data extraction and analysis system 100. Illustrative examples of databases 104 that may be maintained in certain embodiments of the data extraction and analysis system 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The data extraction and analysis system 100 also may include one or more user devices 106 and/or supervisor devices 110. User devices 106 and supervisor devices 110 may display content received via the data extraction and analysis system 100, and may support various types of user interactions with the content. In some embodiments, the user devices 106 and the supervisor devices 110 can be configured to access data in, edit data in, retrieve data from, and/or provide data to the data extraction and analysis system.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120. In some embodiments, the designated role of a device, including a user device 106 or a supervisor device 110 can vary based on the identity of the user using that device. Thus, in some embodiments, both user and supervisor devices 106, 110 can include the same hardware, but can be configured as one of a user device 106 or a supervisor device 110 at the time of log-in by a user to use that device.

In different contexts of data extraction and analysis systems 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom, a clinic, or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The data extraction and analysis system 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in data extraction and analysis systems 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In data extraction and analysis systems 100 used for media distribution, interactive gaming, and the like, a content server 112 may include media content files such as music, movies, television programming, games, and advertisements. In some embodiments, the one or several content servers 112 can be in communicating connection with the content management server 102 via, for example, the internet or other communication network.

In some embodiments, the data extraction and analysis system 100 can include a plurality of content servers 112 that can contain the same or different content. In some embodiments, this plurality of content servers 112 can be controlled as a part of the data extraction and analysis system 100, and in some embodiments, this plurality of content servers 112 can be controlled independent of the data extraction and analysis system 100. IN such an embodiments, data can be transferred to and/or from one or several of the plurality of content servers 112 and some or all of the other components of the data extraction and analysis system 100.

In one embodiment, for example, the data extraction and analysis system 100 can include a first content server, a second content server, a third content server, and/or a fourth content server. In some embodiments, for example, some or all of the first, second, third, and fourth content servers can host websites, which can be unique. These websites can contain information that can be retrieved and/or used by some or all of the other components of the data extraction and analysis system 100. In some embodiments, the first content server can be configured to host and/or can host a first website containing a first portion of species data, the second content server can be configured to host and/or can host a second portion of species data, the third content server can be configured to host and/or can host a first portion of qualitative data, and/or the fourth content server can be configured to host and/or can host a second portion of qualitative data.

User data server 114 may include hardware and software components that store and process data for multiple users relating to each user's activities and usage of the data extraction and analysis system 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the data extraction and analysis system 100. For example, the administrator server 116 may monitor device status and performance for the various servers, databases, and/or user devices 106 in the data extraction and analysis system 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The data extraction and analysis system 100 may include one or more communication networks 120. Although only a single network 120 is identified in FIG. 1, the data extraction and analysis system 100 may include any number of different communication networks between any of the computer servers and devices shown in FIG. 1 and/or other devices described herein. Communication networks 120 may enable communication between the various computing devices, servers, and other components of the data extraction and analysis system 100. As discussed below, various implementations of data extraction and analysis systems 100 may employ different types of networks 120, for example, computer networks, telecommunications networks, wireless networks, and/or any combination of these and/or other networks.

In some embodiments, some of the components of the data extraction and analysis system 100 can belong to the content network 122. The content network 122 can include, for example, the content management server 102, the database server 104, the privacy server 108, the content server 112, the user data server 114, the administrator server 116, and/or the communication network 120. The content network 122 can be the source of content distributed by the data extraction and analysis system 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

Figure 2:
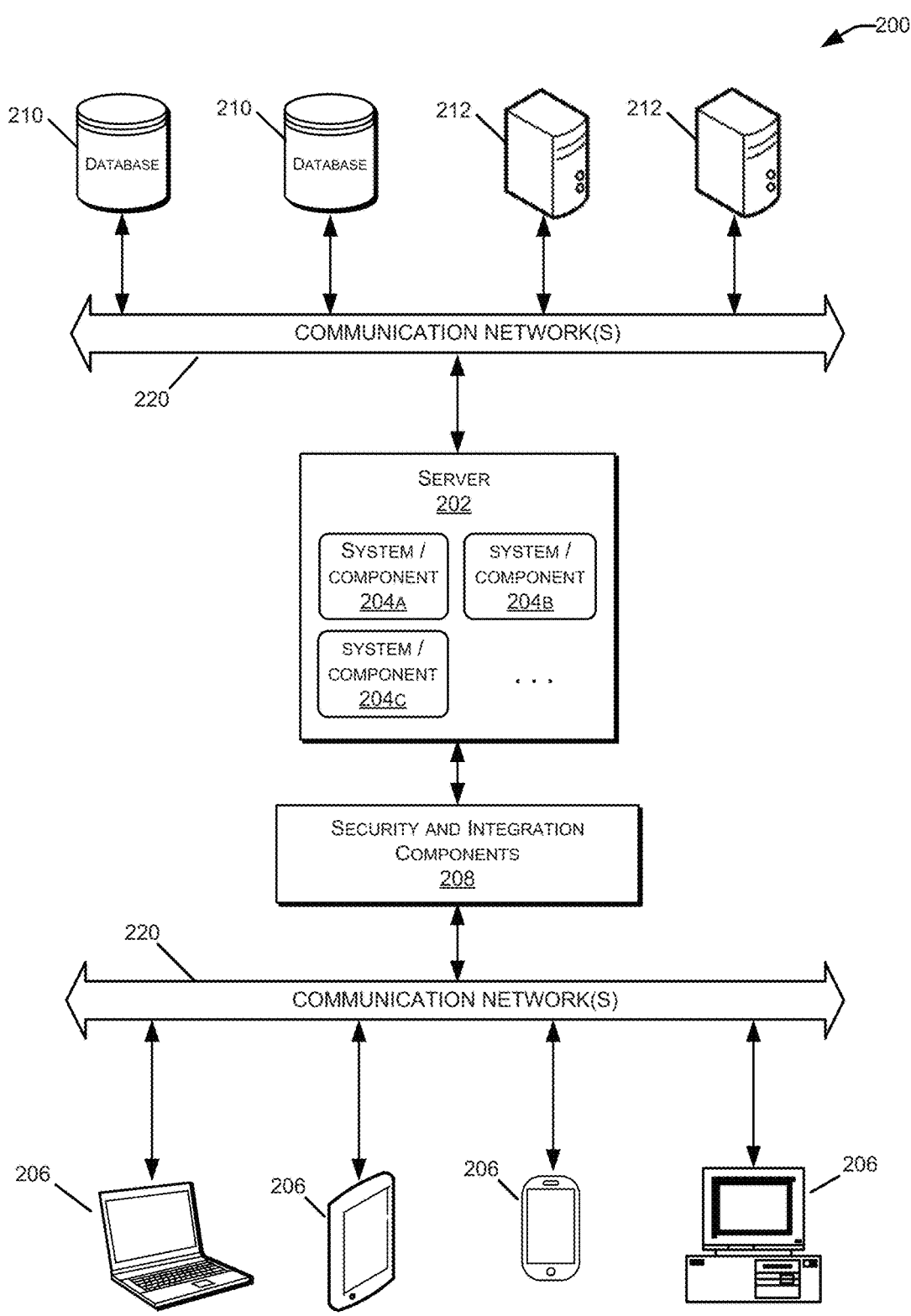
FIG. 2 is a block diagram illustrating a computer server and computing environment within a data extraction and analysis system.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and data extraction and analysis systems 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the data extraction and analysis system 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the data extraction and analysis system 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN). In some embodiments, the computing environment can be replicated for each of the networks 105, 122, 104 discussed with respect to FIG. 1 above.

Figure 3:
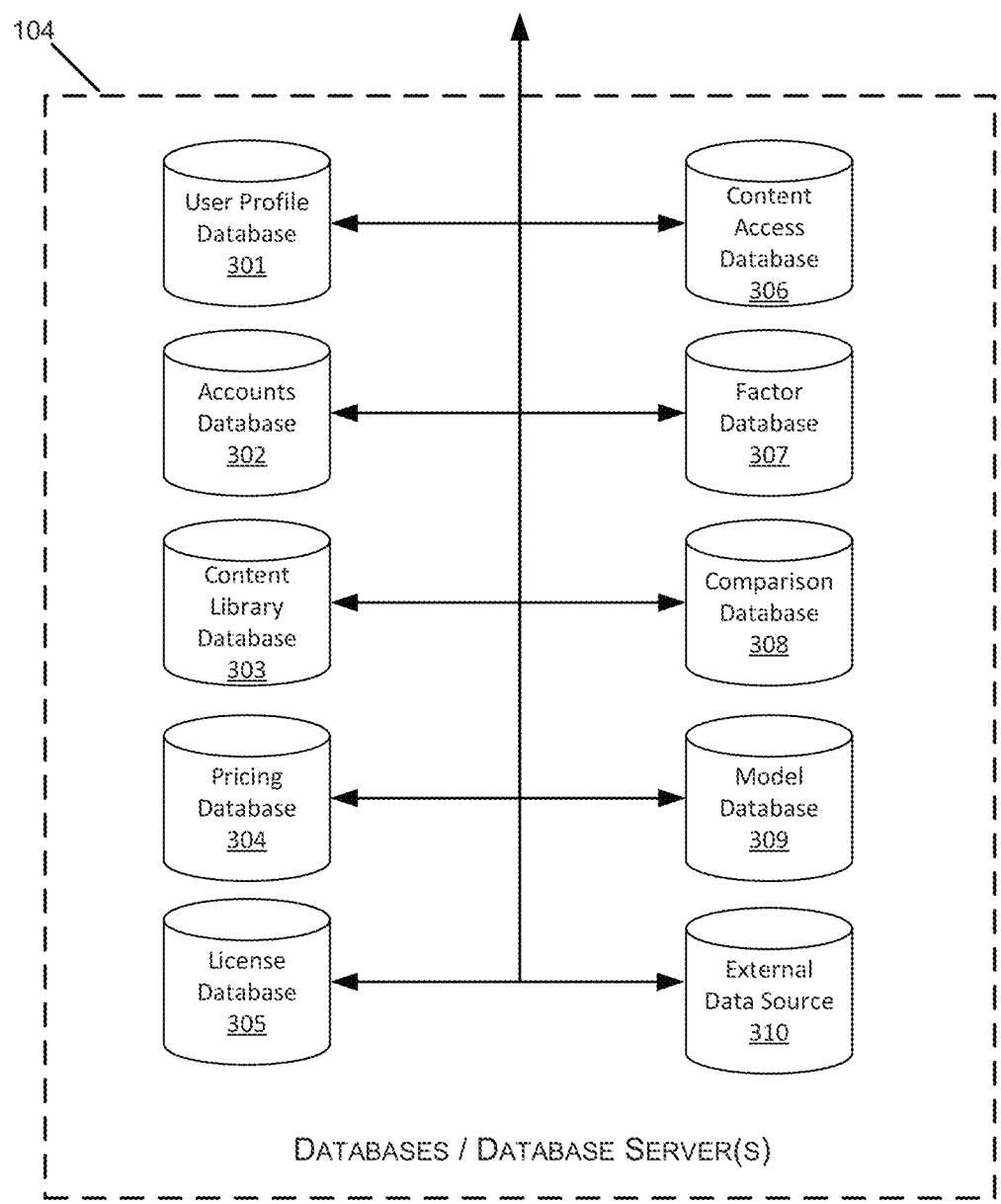
FIG. 3 is a block diagram illustrating an embodiment of one or more database servers within a data extraction and analysis system.

With reference to FIG. 3, an illustrative set of databases and/or database servers is shown, corresponding to the databases servers 104 of the data extraction and analysis system 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a data extraction and analysis system 100. It should be understood that the below descriptions of databases 301-310, including their functionality and types of data stored therein, are illustrative and non-limiting. Database server architecture, design, and the execution of specific databases 301-310 may depend on the context, size, and functional requirements of a data extraction and analysis system 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 301 may include information relating to the end users within the data extraction and analysis system 100. Generally speaking the user profile database 301 can be a database having restrictions on access, which restrictions can relate to whether one or several users or categories of users are enabled to perform one or several actions on the database or on data stored in the database. In some embodiments, the user profile database 301 can include any information for which access is restricted. This information may include user characteristics such as the user names, access credentials (e.g., logins and passwords), user preferences, and information relating to any previous user interactions within the data extraction and analysis system 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, the user profile database 301 can include information relating to a categorization of one or several users, and specifically relating to an access categorization of one or several users. In some embodiments, these categorizations of the one or several users can be relevant to the type or data that the user is allowed to access and/or the degree to which the user can access, edit, retrieve, and/or provide data. These classifications can relate to the level of responsibility of the user so that the user is able to access all data useful to their responsibility. In some embodiments, this data can include personal information collected from one or several individuals such as students, employees, patients, or the like. In embodiments in which this data relates to one or several students associated with the data extraction and analysis system 100, these one or several students can be, for example, one or several students taking classes via an institutional user of the data extraction and analysis system. In some embodiments, these categories can include, for example, a trusted entity, a first tier administrator, a second tier administrator, a third tier administrator, an instructor, a guardian, and/or a student.

In some embodiments, the trusted entity is allowed to access all data contained within the data extraction and analysis system 100, and the first tier administrator is able to access data contained within the data extraction and analysis system 100 relating to a first tier describing a largest level of a political entity such as, for example, a school district, a university, a healthcare network, or the like. In some embodiments, the second tier administrator is able to access a subset of the data contained within the data extraction and analysis system 100 relating to the first tier, alternatively described as all of the data relating to the second tier describing a sub-level of the political entity such as a school within a school district, a college within a university, a healthcare service provider such as, for example, a clinic or a hospital, in the healthcare network, or the like. In some embodiments, the third tier administrator is able to access a subset of the data contained within the data extraction and analysis system 100 relating to the second tier, alternatively described as all of the data relating to the third tier describing a sub-level of the sub-level political entity such as, for example, a department within a school or a college, a group within a healthcare service provider, or the like. In some embodiments, the instructor can be, for example, a healthcare provider such as a doctor or a nurse, a teacher, or the like. The instructor can have access to data relating to, for example, courses or sections taught by the teacher, or patients of the healthcare provider. In some embodiments, the guardian can be an individual with legal responsibility for one or several students or patients and can thus have access to data relating to those one or several students or patients. In some embodiments, the student can be a patient or a student in a course, and can have access to their own information.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the data extraction and analysis system 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the data extraction and analysis system 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the data extraction and analysis system 100.

An accounts database 302 may generate and store account data for different users in various roles within the data extraction and analysis system 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the data extraction and analysis system 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the data extraction and analysis system 100.

A pricing database 304 may include pricing information and/or pricing structures for determining payment amounts for providing access to the data extraction and analysis system 100 and/or the individual content resources within the network 100. In some cases, pricing may be determined based on a user's access to the data extraction and analysis system 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the data extraction and analysis system 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the data extraction and analysis system 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A factor database 307 can include information relating to one or several attributes of a request, attributes of data and/or information associated with the request, and/or attributes of a data or information source. In some embodiments, these one or several attributes can include information relating to and/or allowing identification of a received request. These attributes can include, for example, information identifying the user submitting the request, information identifying one or several attributes of the user submitting the request including, for example, user style such as user teaching style, user performance, user skills, or the like. In some embodiments, these attributes can identify, for example, a context of the request, which context can identify the subject matter of the request, the subject of the request, the intended use of the response to the request, or the like. In some embodiments, this context can identify, for example, a course associated with the request, and more specifically, can identify a syllabus for a course associated with the request.

A comparison database 308 can include information relating to a comparison of all or portions of the species content with the qualitative data. In some embodiments, this can include identifying associations between the species content and the qualitative data. In some embodiments, for example, the species content can information identifying the substance of one or several courses such as, for example, syllabi for one or several courses, and in some embodiments, the qualitative data can be data indicating the degree of success associated with the species content. For example, in some embodiments, the qualitative data can comprise evaluation information such as information retrieved from one or several reviews. This evaluation information can characterize the quality of a course and/or the degree to which the course achieved one or several objectives such as, for example, bringing students to a desired level of knowledge, mastery, or comprehension, or the like. In some embodiments, this evaluation information can be gathered from a plurality of websites via processes described below. This evaluation information can then be reviewed and linked to all or portions of the species content such that information retrieved from a review is associated with the course evaluated in the review.

The comparison database 308 can further include information relating to the comparison of options for one or several variables. In some embodiments, this information can include information identifying which of the options results in certain desired outcomes, which of the options results in the most desired outcome, a rank order of the options, or the like.

A model database 309 can include one or several statistical models. These one or several statistical models can include, for example, one or several levels of a multilevel model. In some embodiments, these one or several statistical models can be generated using information from one or both of the factor database 307 and the comparison database 308. In some embodiments, these statistical models can be used to generate a recommendation in response to the received request. This recommendation can identify, for example, content to include or exclude from the course, one or several skills for development, one or several techniques for use in the course, or the like.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the data extraction and analysis system 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
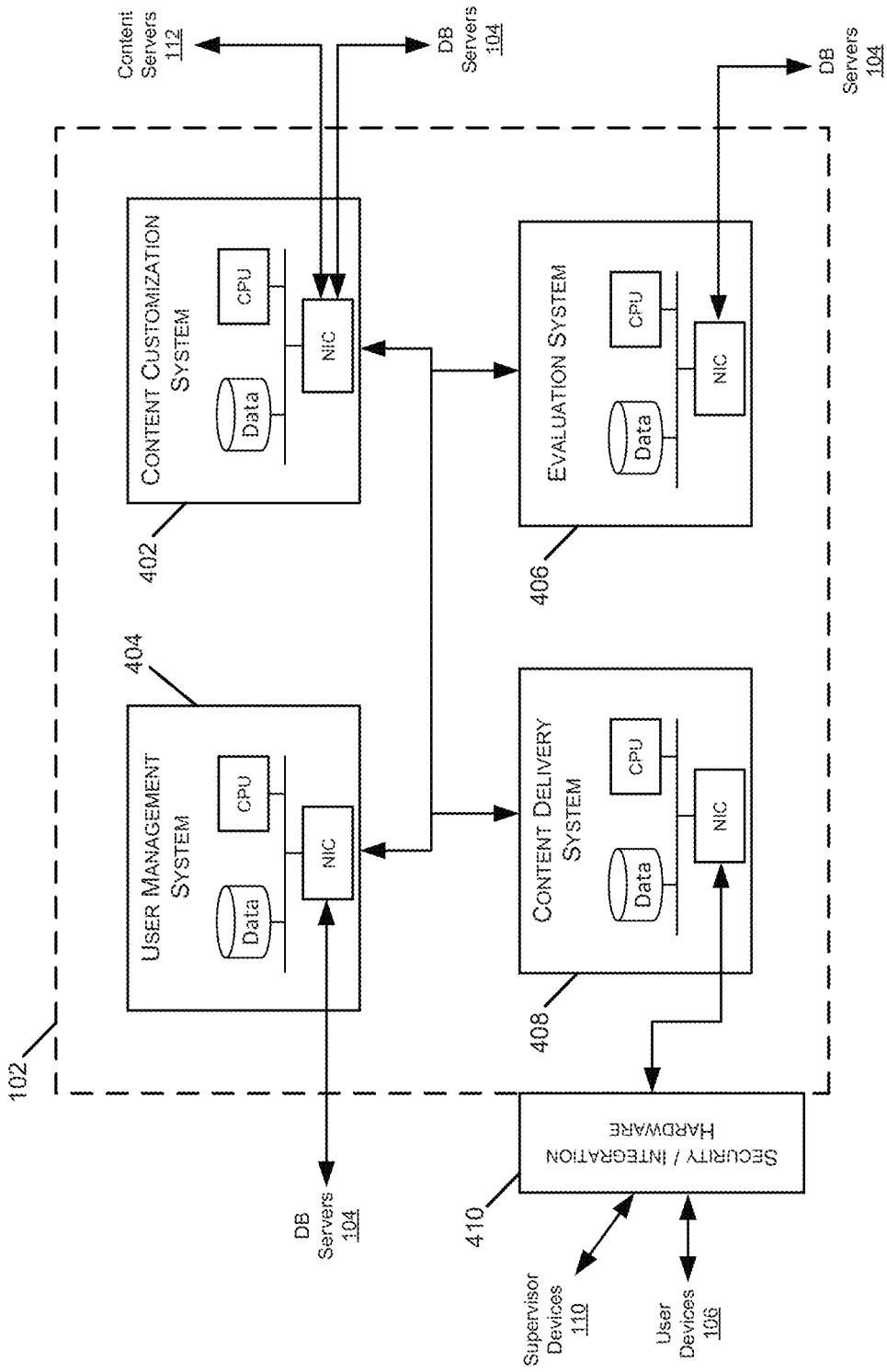
FIG. 4 is a block diagram illustrating an embodiment of one or more content management servers within a data extraction and analysis system.

With reference now to FIG. 4, a block diagram is shown illustrating an embodiment of one or more content management servers 102 within a data extraction and analysis system 100. As discussed above, content management server(s) 102 may include various server hardware and software components that manage the content resources within the data extraction and analysis system 100 and provide interactive and adaptive content to users on various user devices 106. For example, content management server(s) 102 may provide instructions to and receive information from the other devices within the data extraction and analysis system 100, in order to manage and transmit content resources, user data, and server or client applications executing within the network 100.

A content management server 102 may include a content customization system 402. The content customization system 402 may be implemented using dedicated hardware within the data extraction and analysis system 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), and the like. Based on the retrieved information from databases 104 and other data sources, the content customization system 402 may modify content resources for individual users.

A content management server 102 also may include a user management system 404. The user management system 404 may be implemented using dedicated hardware within the data extraction and analysis system 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the data extraction and analysis system 100 (e.g., an evaluation server 406), or using designated hardware and software resources within a shared content management server 102. The evaluation system 406 may be configured to receive and analyze information from user devices 106 via, for example, the end-user server 107. For example, various ratings of content resources submitted by users may be compiled and analyzed, and then stored in a database (e.g., a content library database 303) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the data extraction and analysis system 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
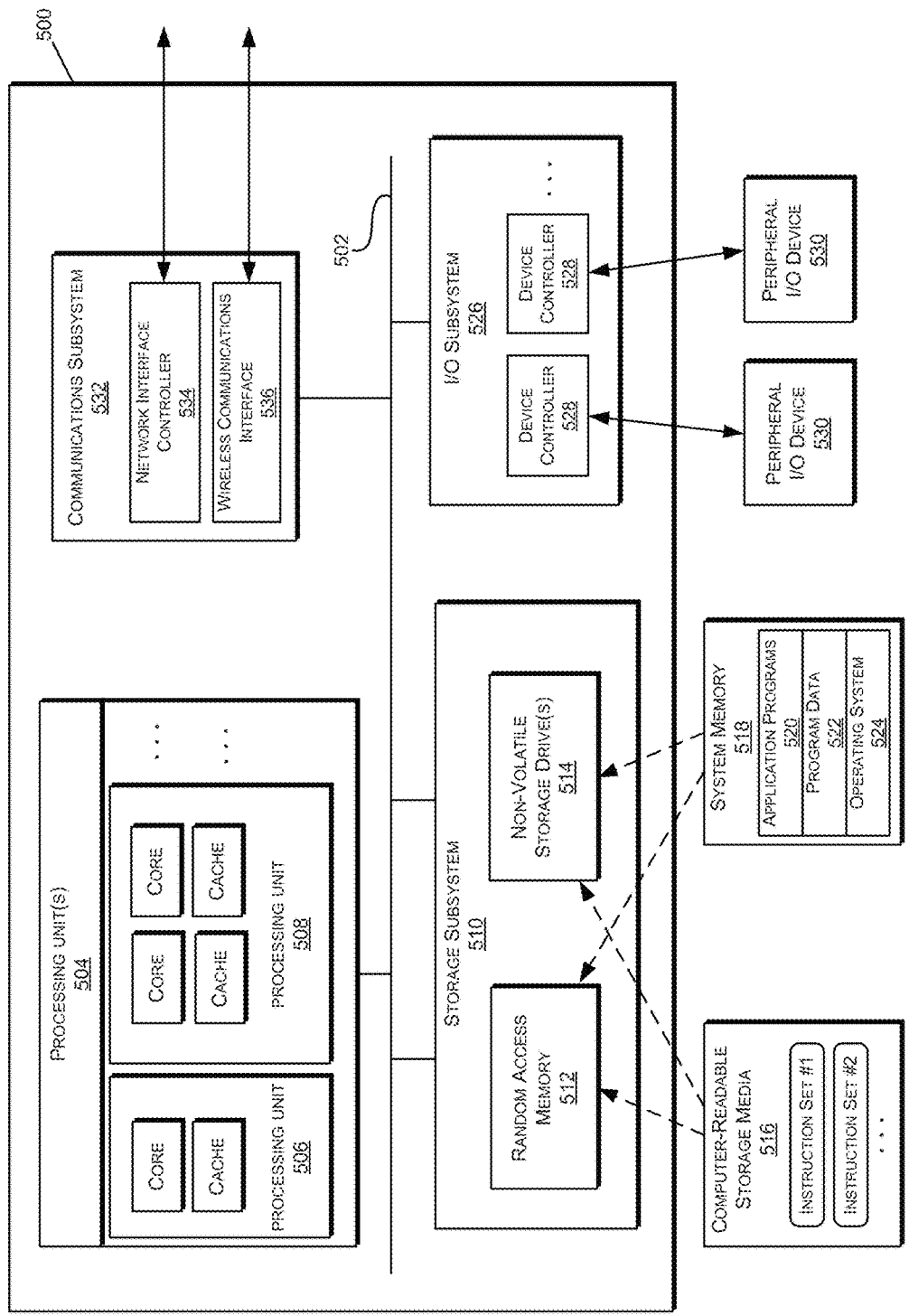
FIG. 5 is a block diagram illustrating the physical and logical components of a special-purpose computer device within a data extraction and analysis system.

With reference now to FIG. 5, a block diagram of an illustrative computer system is shown. The system 500 may correspond to any of the computing devices or servers of the data extraction and analysis system 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
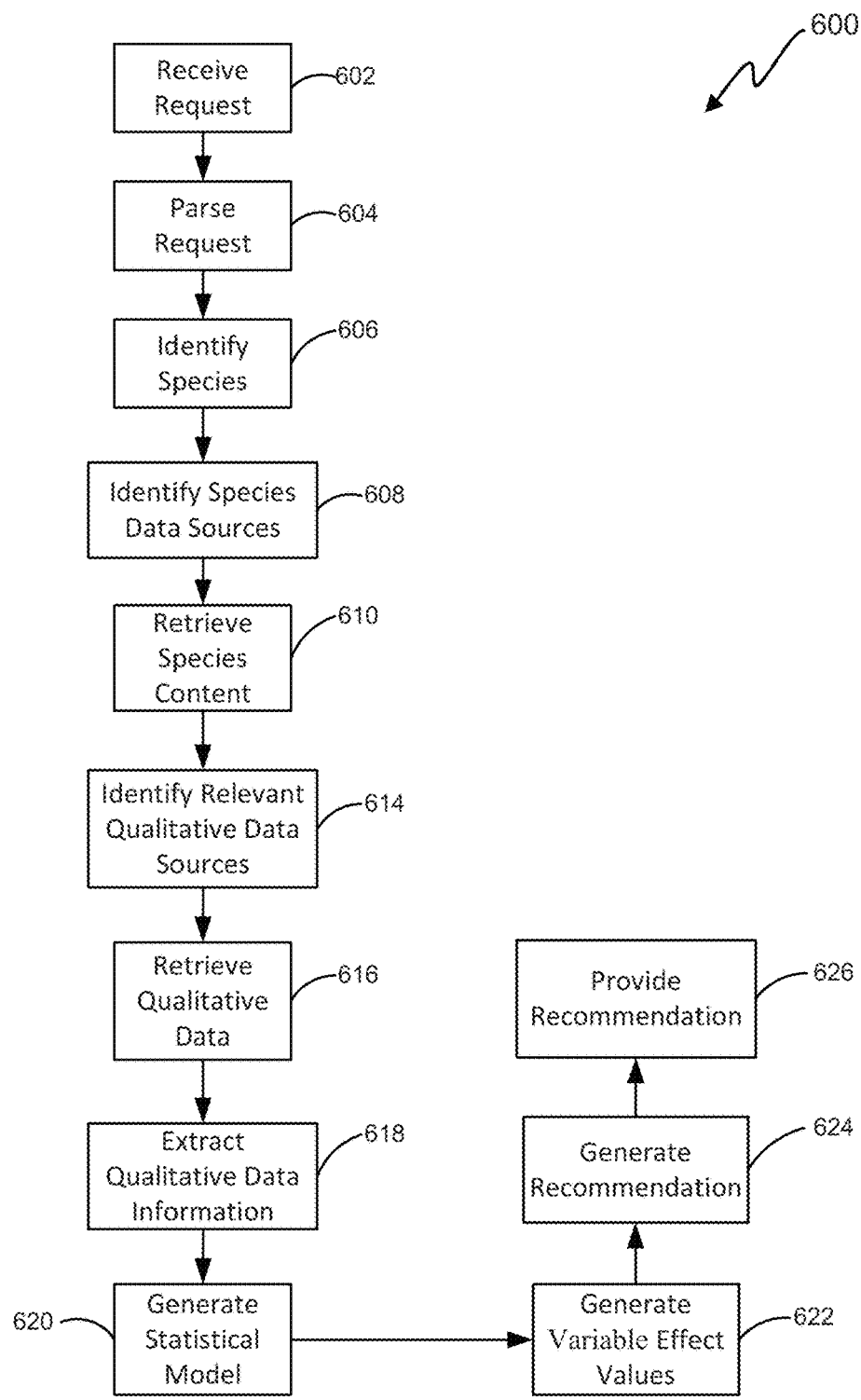
FIG. 6 is a flowchart illustrating one embodiment of a process for data extraction and analysis.

With reference now to FIG. 6, a flowchart illustrating one embodiment of a process 600 for data extraction and analysis is shown. The method can be performed using some or all of the components of the data extraction and analysis system 100. The process 600 begins at block 602, wherein a request is received. In some embodiments, the request can be received by the content management server 102 from one or several of the devices 106, 110. In some embodiments, the request can include information relating to the user making the request (the requestor), information relating to a request context such as, for example, the course for which the request is being made, or the like. In some embodiments, the request can include information identifying a species such as, for example, a course, a type of course, a subject matter, or the like, and a variable. In some embodiments, the variable can identify one or several aspects of the species that are proposed for change. This can include, for example, one or several pieces of content for addition or removal from the course, one or several changes to course organization, one or several changes to course workload such as, for example, the number, size, and/or frequency of labs, quizzes, tests, assignments, and/or the like, one or several changes to teaching style, or to the course instructor, or the like.

After the request has been received, the process 600 proceeds to block 604, wherein the request is parsed by, for example, the content management server 102. In some embodiments, the request can be parsed to retrieve information identifying the species and/or the variable, and/or to retrieve information to use in determining the species and/or the variable. After the request has been parsed, the process 600 proceeds to block 606, wherein the species is identified. In some embodiments, this identification can be performed with the parsed requests. After the category has been identified, the process 600 proceeds to block 608, wherein one or several species data sources are identified. These one or several species data sources can be one or several sources of species data and can be, for example, one or several content servers 112.

As used herein, "species data" can be any data relating to a species and contained in or located at a species data source. As used herein, "species content" is a subset of species data, which subset is identified as selected for use in generating a recommendation. Thus, the portions of the species data that are extracted from the species data for further use are species content. In some embodiments, species content can be information relating to one or several attributes of a course such as, for example, content used in a course, course assignments, course workload, or the like. In some embodiments, these one or several species data sources can be identified in one of the databases 104 such as, for example, the factor database 307.

In some embodiments, the identification of one or several species data sources can include identifying a species of the request, which species can include identification of a course associated with the request. The information identifying the course associated with the request can be used to retrieve identification of institutions offering one or several similar courses, which identification can include, for example, identification of one or several servers hosting those similar courses and/or identification of one or several websites containing information for those similar courses.

After one or several species data sources have been identified, the process 600 proceeds to block 610, wherein species content is retrieved from the one or several species data sources. In some embodiments, this species content can be retrieved from the one or several species data sources using a variety of techniques including, for example, web scraping, or the like. After the species content has been retrieved, the some or all of the species content can be extracted, which extraction can include the parsing of the species content and the identification of important portions of the species content.

After the species content has been retrieved, the process 600 proceeds to block 614, wherein one or several relevant qualitative data sources are identified. In some embodiments, these one or several relevant qualitative data sources can comprise one or several content servers 112 hosting one or several websites containing reviews and/or evaluations relevant to the species content. By way of example, in some embodiments, species content, which can be information relating to a course that is similar to the course identified in the request, may be stored on a first server, such as, for example, a school or university server at the school or university at which a course is being taught. In such an embodiment, the evaluations for the courses in the species content may be stored on a second server that can, for example, host a third party evaluation website. In such embodiments, the step of block 614 involves the identification of the one or several servers storing evaluations relating to the courses relevant to the request.

In some embodiments, this identification can include, determining whether some or all of a group of potential qualitative data sources contain information relating to all or portions of the species content, and specifically contain evaluations relating to courses identified in the species data. If a potential qualitative data source is identified as containing information relating to all or portions of the species content, then the potential qualitative data source can be identified as a relevant qualitative data source and an indicator of this identification can be stored in one of the databases 104 such as, for example, the factor database 307. In such an embodiment, a qualitative data source can be identified as a relevant qualitative data source based on an indicator stored within one of the databases 104.

After a relevant qualitative data source has been identified, the process 600 proceeds to block 616, wherein the qualitative data is retrieved from the one or several qualitative data sources. In some embodiments, this qualitative data can be retrieved from the one or several qualitative data sources using a variety of techniques including, for example, web scraping, or the like. After the qualitative data has been retrieved, the process 600 proceeds to block 618, wherein some or all of the qualitative data can be extracted, which extraction can include the parsing of the qualitative data and the identification of important portions of the qualitative data, which important portions of the qualitative data are referred to herein as qualitative data information. This extraction will be discussed at greater length below with respect to FIG. 8.

After the qualitative data information has been extracted, the process 600 proceeds to block 620, wherein a statistical model is generated. In some embodiments, the statistical model can be generated with the qualitative data information and the species content. In some embodiments, this statistical model can identify one or several variables, also referred to herein as factors, within the species and the degree to which these one or several variables affect the outcome. This statistical model can thus isolate the effect of some or all of these one or several variables to allow the use of the statistical model in predicting a species effectiveness based on the variables of that species. Specifically, the statistical model can be used to predict whether, and to what degree the quality of a course will improve or diminish based on one or several changes to the course such as, for example, one or several changes in some or all of the course content, workload, work, or the like. The details of the generation of the statistical model will be discussed at greater length below.

After the statistical model has been generated, the process proceeds to block 622, wherein variable effect values are generated. In some embodiments, the variable effect values can identify the degree to which one or several variables affect the degree to which one or several course objectives are achieved and/or affect the quality of the course. These variable effect values can be based on the statistical model and/or can be built into the statistical model.

In some embodiments, the variable effect values can be generated by selecting a variable and identifying options for that variable. By way of example, in an embodiment in which the selected variable is the content of a course, different content options can be identified. Similarly, in embodiments in which assignments, and particularly workload are the variables, different workloads can be selected. In some embodiments, a content option can be identified that is associated with base content and qualitative data, and specifically that is associated with a sufficient amount of base content and qualitative data to allow the creation of a reliable multilevel model. In some embodiments, such a model can require such a number of pieces of data, and specifically sufficient amounts of one or both of base content and qualitative data such that a computer is required to generate such reliable multilevel models. In some embodiments, such a model can be created with at least 1000 pieces of data, 10,000 pieces of data, 100,000 pieces of data, 1,000,000 pieces of data, or any other or intermediate number of pieces of data.

After the desired variable(s) and its option(s) have been selected, a statistical model can be created for the variable(s) and option(s). In some embodiments, this statistical model can be a multilevel model. In some embodiments, these statistical models can allow multivariate data analysis to enable observation and analysis of more than one statistical outcome variable at a time. Using this statistical model, the effects of the different options for one or several variables can be compared. This comparison can be used to generate variable effect values which can be, for example, a value relatively ranking the different options of a variable, a variable reflecting the degree to which an option improves or worsens a course, or the like.

After the factor effect values have been generated, the process 600 proceeds to block 624, wherein a recommendation is generated. In some embodiments, the recommendation can be an indication of how the species can be changed to affect an improvement of the species, and specifically how the course can be changed to improve the course. After the recommendation has been generated, the process 600 proceeds to block 626, wherein the recommendation is provided, and specifically, is provided to the user via, for example, one of the devices 106, 110.

Figure 7:
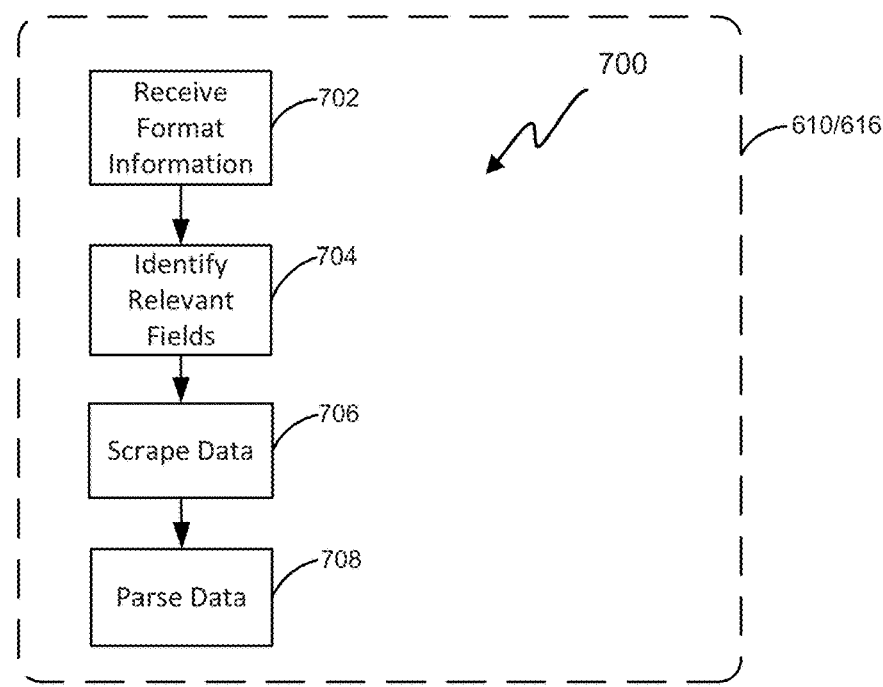
FIG. 7 is a flowchart illustrating one embodiment of a process for retrieving content.

With reference now to FIG. 7, a flowchart illustrating one embodiment of a process 700 for retrieving content is shown. The process 700 can be performed by the components of the data extraction and analysis system 100. In some embodiments, content can be retrieved through the use of other technologies including, for example, crowdsourcing technologies and techniques. In some embodiments, this process 700 can be performed in the place of, or as a part of one or both of steps 610, 616 of process 600 shown in FIG. 6. The process 700 begins at block 702, wherein format information is received. In some embodiments, the format information can identify the format of information in one or several of the content servers 112. In some embodiments, for example, the format information can identify where and/or how information is stored by one or several of the content servers. In some embodiments, the format information of a content server 112 can be received from that content server 112, and in some embodiments, the format information can be received from one of the databases 104.

After the format information has been received, the process 700 proceeds to block 704, wherein one or several relevant fields are identified. In some embodiments, the identification of one or several relevant fields can be the identification of one or several locations within the content server 112 and/or the webpage hosted by the content server, in which locations relevant information is stored. The identification of the relevant fields can be achieved through the use of the format information.

After the relevant fields have been identified, the process 700 proceeds to block 706, wherein the data is scraped from the content server 112 and specifically is scraped from the webpage hosted by the content server 112. This scraping can be web scraping. As sued herein, "web scraping" is a computer software technique of extracting information from websites. In some embodiments, this data can be scraped from the identified relevant fields, and can be scraped through the use of scraping software including, for example, web-scraping software.

After the data has been scraped, the process 700 proceeds to block 708, wherein the data is parsed. In some embodiments, the step of block 708 can take the scraped data and identify one or several components of the species data for use in generating a recommendation. These identified components of the species data can include, for example, one or several course attributes relevant to the variable of the request such as, for example, the type of content in the course, the amount of content in the course, the workload in the course, the distribution of time between tasks in a course such as, for example, the percent of time spent with tests, quizzes, homework, labs, or the like.

In some embodiments, the parsing of the data can include the process of analyzing one or several characters or symbols in a string of characters or symbols forming the scraped data according to rules of a formal grammar and in some embodiments, can include natural language processing. After the data has been parsed, the process 700 proceeds with the remainder of process 600, and specifically proceeds with either 612 or 618 of process 600 shown in FIG. 6.

Figure 8:
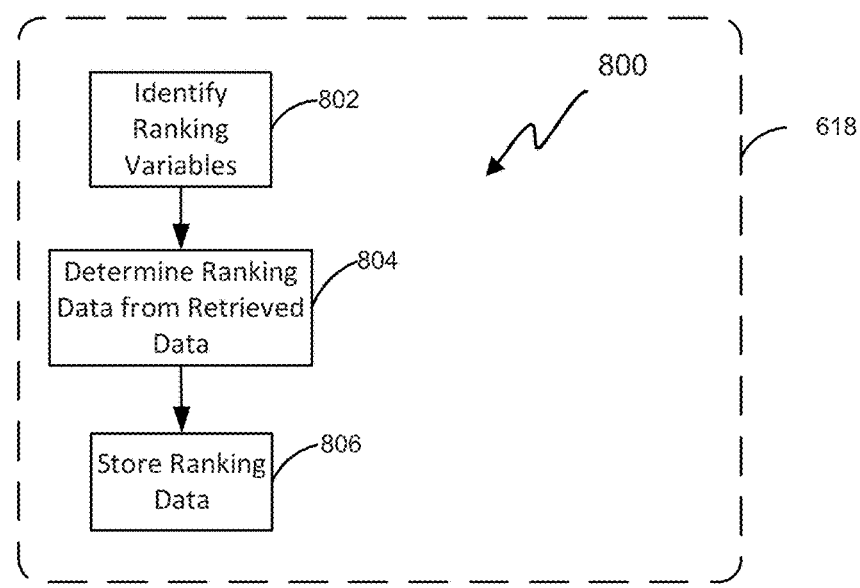
FIG. 8 is a flowchart illustrating one embodiment of a process for extracting data information.

With reference now to FIG. 8, a flowchart illustrating one embodiment of a process 800 for extracting data information is shown. In some embodiments, this process 800 can be performed in the place of, or as a part of step 618 of process 600 shown in FIG. 6. The process 800 begins at block 802, wherein one or several ranking variables, also referred to herein as rating variables, are identified. In some embodiments, these ranking variables can relate to one or several aspects of the quality of species identified in the qualitative data, and specifically can correspond to the quality as indicated in an evaluation of one or several aspects of a course. These aspects of a course can include, for example, the quality of the material used in the course, the quality of the teacher, the quality of the assignments, or the like.

After the ranking variables have been identified, the process 800 proceeds to block 804, wherein ranking data is determined from the retrieved data. In some embodiments, this can include converting information in one or several evaluations into a unique value for some or all of the ranking variables. After the ranking data has been determined, the process 800 proceeds to block 806, wherein the ranking data is stored. In some embodiments, the ranking data is stored in one of the databases 104 such as, for example, the comparison database 308. After the ranking data has been stored, the process 800 proceeds with block 620 of process 600 shown in FIG. 6.

Figure 9:
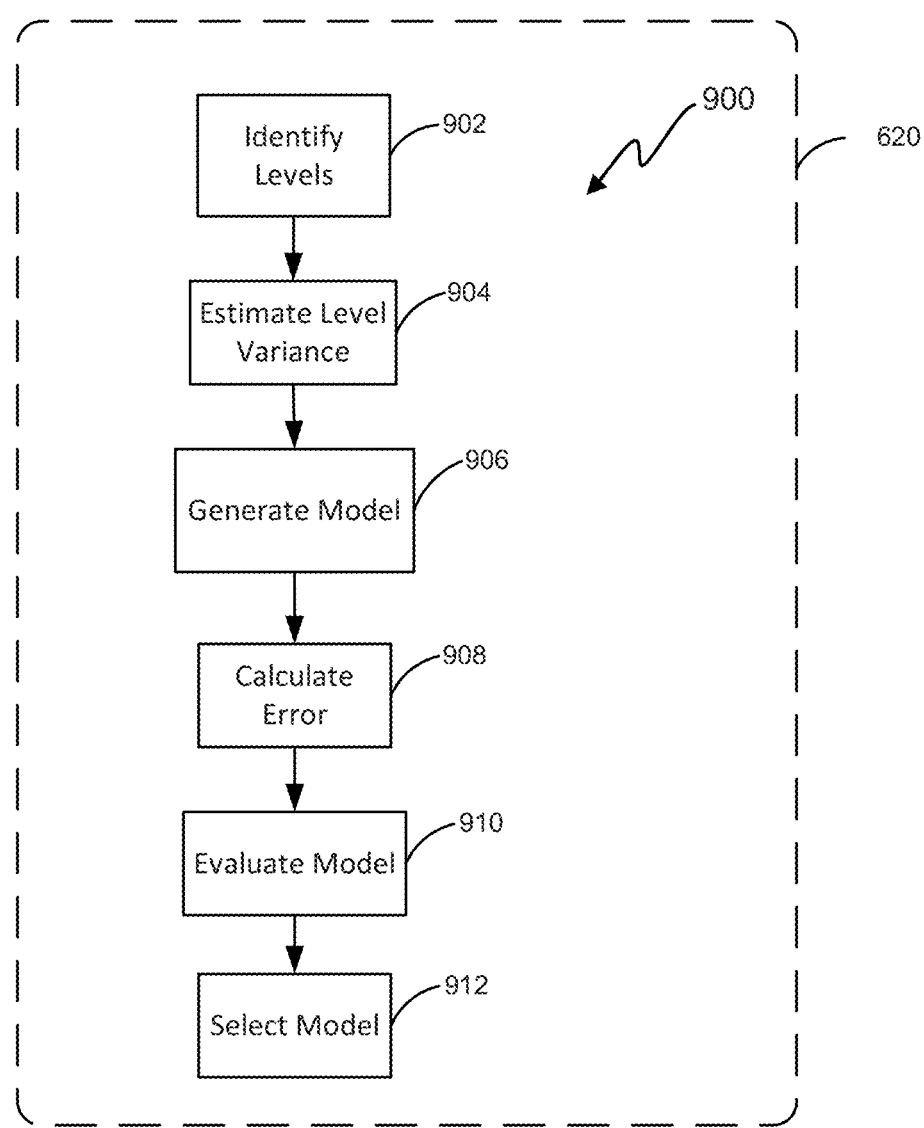
FIG. 9 is a flowchart illustrating one embodiment of a process for the creation of a statistical model.

With reference now to FIG. 9, a flowchart illustrating one embodiment of a process 900 for the creation of a statistical model, such as a multilevel model, is shown. As used herein, a multilevel model is a statistical models of parameters that vary at more than one level. In some embodiments, the process 900 can be performed as a part of, or in place of step 620 of FIG. 6. The process 900 begins at block 902 wherein a plurality of levels is identified. In some embodiments, the levels can correspond to different groupings of data. Thus, in one embodiment, a first level can correspond to data segregated by course, a second level can correspond to data segregated by teacher, and a third level can correspond to data segregated by education institution. In such levels, and when a single course is selected, the first level corresponding to data segregated by course would be fully included in the second level corresponding to data segregated by teacher when the teacher of the second level teaches the selected single course, and both the first and second level data would be included in the third level data if the course and the teacher of the course were at the institution of the third level.

After the levels have been identified, the process 900 proceeds to block 904, wherein the level of variance is estimated. Specifically, and in some embodiments, the estimation of the level of variance can include the estimation of the level of variance each of the levels of the multilevel model.

After the levels of variance have been estimated, the process 900 proceeds to block 906, wherein a model is generated. In some embodiments, this model can comprise models at all levels and thus can comprise a simplified model that is the statistical model generated for the lowest level, or in other words, generated for the level that does not include all of the data of any other level, as well as models for the other levels. Thus, using the levels identified above, step 906 could include the generation of a first statistical model at the first level, a second statistical model at the second level, and a third statistical model at the third level.

After the model has been generated, the process 900 proceeds to block 908, wherein the error is calculated. In some embodiments, the error can be calculated for each of the models generated in block 906. The calculation of this error can include the generation of confidence intervals for each of the models. After the error has been calculated, the process 900 proceeds to block 910, wherein the models are evaluated. In some embodiments, this can include the comparison of the different levels of the model to determine which of the levels is the best model. In some embodiments, the different levels of the models can be compared using at least one of a Chi-squared likelihood ratio test, an Akaike information criterion (AIC), and a Bayesian information criterion (BIC). After the models have been compared, the process 900 proceeds to block 912, wherein a model at one of the levels is selected. In some embodiments, the level of the model is selected that is the best model, which determination can be made according to one of the Chi-squared likelihood ratio test, the Akaike information criterion (AIC), and the Bayesian information criterion (BIC).

Figure 10:
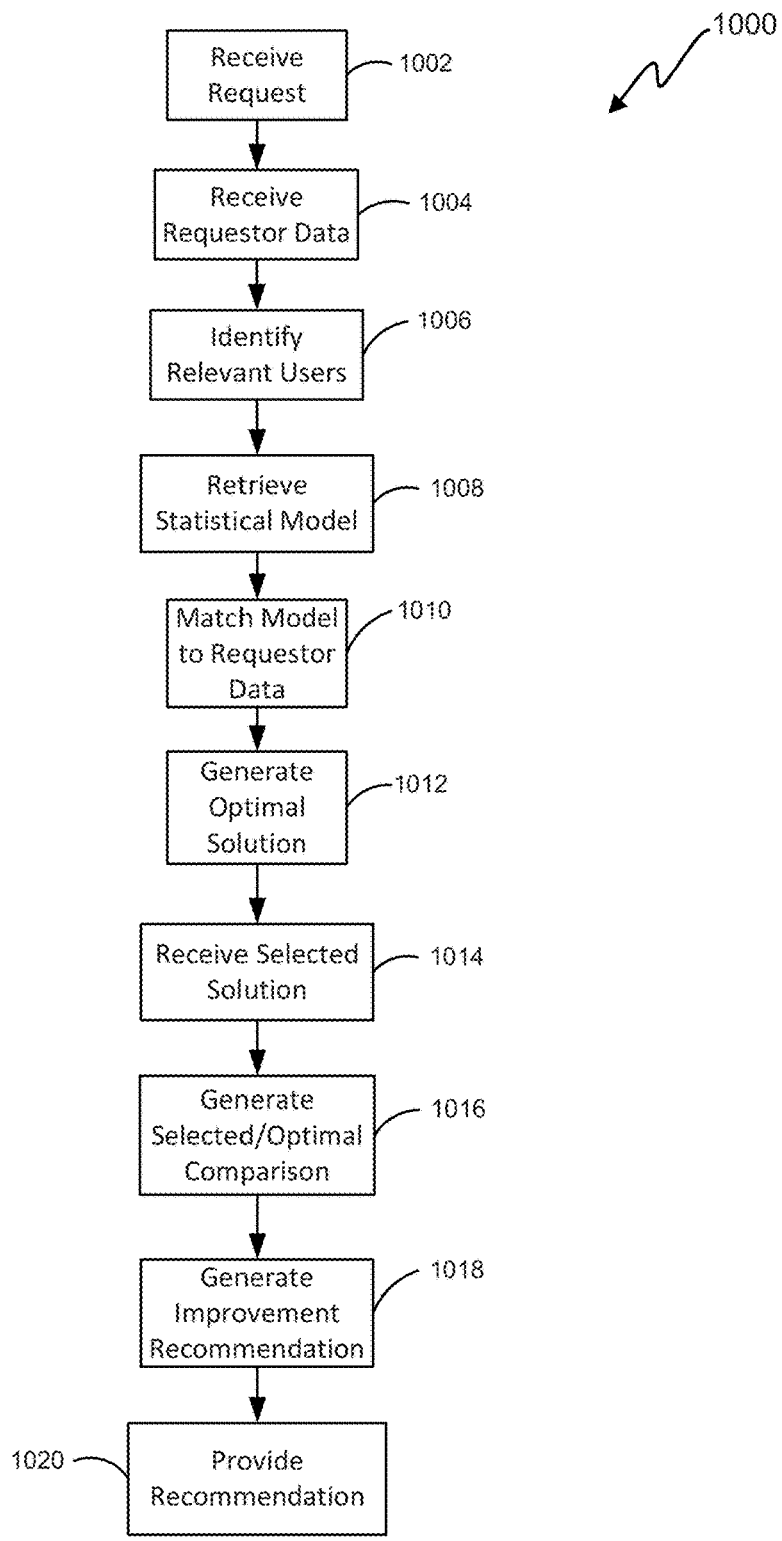
FIG. 10 is a flowchart illustrating one embodiment of a process for customizing a recommendation.

With reference now to FIG. 10, a flowchart illustrating one embodiment of a process 1000 for customizing a recommendation is shown. The process 1000 begins at block 1002, wherein a request is received. In some embodiments, the request can be received by the content management server 102 from one or several of the devices 106, 110. In some embodiments, the request can include information relating to the user making the request (the requestor), information relating to a request context such as, for example, the course for which the request is being made, or the like. In some embodiments, the request can include information identifying a species such as, for example, a course, a type of course, a subject matter, or the like, and a variable. In some embodiments, the variable can identify one or several aspects of the species that are proposed for change. This can include, for example, one or several pieces of content for addition or removal from the course, one or several changes to course organization, one or several changes to course workload such as, for example, the number, size, and/or frequency of labs, quizzes, tests, assignments, and/or the like, one or several changes to teaching style, or to the course instructor, or the like.

After the request has been received, the process 1000 proceeds to block 1004, wherein requestor data is received. In some embodiments, the requestor data can be data identifying one or several attributes of the requestor such as, for example, one or several of a teaching style, skill level, personality, or the like. After the requestor data has been received, the process 1000 proceeds to block 1006, wherein relevant users are identified. In some embodiments, relevant users are users that can be affected by the recommendation. In some embodiments, for example, relevant users can be students within a course and the requestor can be the instructor of that course.

After the relevant users have been identified, the process 1000 proceeds to block 1008, wherein the statistical model is retrieved. In some embodiments, this can be the statistical model generated in block 620 of FIG. 6. After the statistical model has been retrieved, the process 1000 proceeds to block 1010, wherein the model is matched to the requestor data. In some embodiments, this can include adjusting the data used to generate the statistical model to correspond to the requestor data. This can include, for example, only including data for instructors having the same or similar teaching style, skill level, personality, or the like in the data used to generate the model. In some embodiments, this can further include generating a profile for the users and matching the qualitative data to this profile for the users. This could specifically include generating a profile for the students in a course, which profile could include learning styles, intelligence, demographic information, or the like, and matching the qualitative data to that profile.

After the model has been matched to the profile, the process 1000 proceeds to block 1012, wherein an optimal solution is generated. In some embodiments, this can include iteratively evaluating options for variables within the models until a best combination of options is found. After the optimal solution has been generated, the process 1000 proceeds to block 1014, wherein a selected solution is received. In some embodiments, this can occur when the requestor selects options for his species or course via device 106, 110. After the selected solution has been received, the process 1000 proceeds to block 1016, wherein a comparison between the selected solution and the optimal solution is generated. In some embodiments, this comparison can be a graphical comparison that can depict the effect of different option of the quality of the species.

After the comparison between the selected solution and the optimal solution has been generated, the process 1000 proceeds to block 1018, wherein an improvement recommendation is generated. In some embodiments, the improvement recommendation can identify one or several changes that can be made to the selected solution to improve the selected solution. In some embodiments, the improvement recommendation can identify a number of changes that can be provided to the requestor in rank order from having the greatest positive impact on the species to the least positive impact on the species, and thus the generation of the improvement recommendation can include the ranking of options from greatest to least impact. After the improvement recommendation has been generated, the process 1000 proceeds to block 1020, wherein the improvement recommendation is provided. In some embodiments, the improvement recommendation can be provided to the user via one or devices 106, 110. In some embodiments, this improvement recommendation can provide all options to the requestor, and in some embodiments, this improvement recommendation can provide the top options such as, for example, the top 2 options, the top 3 options, the top 10 options, the top 5% of options, the top 10% of options, the top 20% of options, or any other or intermediate number of options.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A data extraction system comprising:
   a database server comprising:
     a comparison database comprising data ranking options based on a comparison of statistical models;
     a factor database; and
     a model database, wherein the model database comprises a multilevel model, wherein the multilevel model comprises a statistical model of parameters that vary at more than one level; and
   a content management server including:
     a processor, and
     a non-transitory memory storing instructions that when executed by the processor cause the processor to:

receive a request for a recommendation from a user device, wherein the request for a recommendation comprises data identifying a category and a variable;
identify a plurality of species data sources, wherein the species data sources comprise at least a first website hosted by a first content server hosting a first course content and a second website hosted by a second content server hosting a second course content;
retrieve species content from the species data sources, wherein the species content includes the first course content and the second course content;
parse the first course content to identify a first title of the first course content, a course associated with the first course content, and an education institution associated with the first course content;
parse the second course content to identify a second title of the second course content, a course associated with the second course content, and an education institution associated with the second course content;
identify, using the first title and the second title, a plurality of potential evaluation data sources, wherein the potential evaluation data sources comprise at least a third website hosted on a third content server and the third website hosts a first evaluation data including the first title and a second evaluation data including the second title;
retrieve potential evaluation data from the potential evaluation data sources, the potential evaluation data including the first evaluation data and the second evaluation data;
extract evaluation data from the retrieved potential evaluation data;
generate the multilevel model based on the species content and the evaluation data, by:
    identifying a first subset of the species content, wherein all species content in the first subset is associated with the same course,
    generating a first level simplified model at a first level of the species content and the evaluation data, wherein the first level simplified model is derived from the first subset of the species content,
    identifying a second subset of the species content, wherein all species content in the second subset is associated with the same education institution,
    generating a second level simplified model at a second level of the species content and the evaluation data, wherein the second level simplified model is derived from the second subset of the species content, and
    estimating level variances for the first level simplified model and the second level simplified model, wherein the level variances comprise the percentage of variation in an aggregate of the species content and the evaluation data attributable to each of the first level simplified model and the second level simplified model; and
provide a recommendation of the first subset of the species content or a second subset of the species content by:
    selecting, using the level variances, the first level simplified model or the second level simplified model, and
    executing the selected one of the first level simplified model or the second level simplified model.

2. The data extraction system of claim 1, wherein retrieving the species content comprises:
    receiving format information, wherein the format information identifies the format in which the species content is contained in the species data source; and
    identifying at least one relevant field in the species data of the species data source.

3. The data extraction system of claim 2, wherein retrieving the species data further comprises scraping the species content from the at least one identified relevant field in the species data.

4. The data extraction system of claim 3, wherein scraping the species content comprises web scraping.

5. The data extraction system of claim 4, wherein retrieving the potential evaluation data comprises:
    receiving format information, wherein the format information identifies the format in which the potential evaluation data is contained in the potential evaluation data source;
    identifying at least one relevant field of the potential evaluation data source; and
    scraping the potential evaluation data from the at least one identified relevant field of the potential evaluation data source.

6. The data extraction system of claim 1, wherein extracting evaluation data information from the retrieved potential evaluation data comprises:
    identifying ranking variables, wherein the ranking variables are stored within the model database;
    identifying the evaluation data;
    generating ranking data corresponding to the ranking variables based on the evaluation data; and
    storing the ranking data.

7. The data extraction system of claim 1, wherein the level variances are calculated as one of a variance partition coefficient (VPC) and an intraclass correlation coefficient (ICC).

8. The data extraction system of claim 7, wherein the first level simplified model and the second level simplified model is selected according to at least one of a Chi-squared likelihood ratio test, an Akaike information criterion (AIC), and a Bayesian information criterion (BIC).

9. A method of data extraction and analysis comprising:
    receiving a request for a recommendation from a user device, wherein the request for a recommendation comprises data identifying a category and a variable;
    identifying a plurality of species data sources, wherein the species data sources comprise at least a first website hosted by a first content server hosting a first course content and a second website hosted by a second content server hosting a second course content, and wherein the identified plurality of species data sources have a category matching the category of the received request;
    retrieving species content from the species data sources, wherein the species content includes the first course content and the second course content;
    parsing the first course content to identify a first title of the first course content, a course associated with the first course content, and an education institution associated with the first course content;
    parsing the second course content to identify a second title of the second course content, a course associated with the second course content, and an education institution associated with the second course content;
    identifying, using the first title and the second title, a plurality of potential evaluation data sources, wherein the potential evaluation data sources comprise at least a third website hosted on a third content server and the third website hosts a first evaluation data including the first title and a second evaluation data including the second title;

retrieving potential evaluation data from the potential evaluation data sources, the potential evaluation data including the first evaluation data and the second evaluation data;

extracting evaluation data from the retrieved potential evaluation data;

generating a multilevel model based on the species content and the evaluation data;

generating the multilevel model based on the species content and the potential evaluation data, by:
  identifying a first subset of the species content, wherein all species content in the first subset is associated with the same course,
  generating a first level simplified model at a first level of the species content and the evaluation data, wherein the first level simplified model is derived from the first subset of the species content,
  identifying a second subset of the species content, wherein all species content in the second subset is associated with the same education institution,
  generating a second level simplified model at a second level of the species content and the evaluation data, wherein the second level simplified model is derived from the second subset of the species content, and
  estimating level variances for the first level simplified model and the second level simplified model, wherein the level variances comprise the percentage of variation in an aggregate of the species content and the evaluation data attributable to each of the first level simplified model and the second level simplified model; and providing a recommendation based on the multilevel model by:
  selecting, using the level variances, the first level simplified model or the second level simplified model, and
  executing the selected one of the first level simplified model or the second level simplified model.

10. The method of claim 9, wherein retrieving the species content comprises:
  receiving format information, wherein the format information identifies the format in which the species content is contained in the species data source;
  identifying at least one relevant field in the species data of the species data source; and scraping the species content from the at least one identified relevant field in the species data.

11. The method of claim 10, wherein retrieving the potential evaluation data comprises:
  receiving format information, wherein the format information identifies the format in which the potential evaluation data is contained in the potential evaluation data source;
  identifying at least one relevant field of the potential evaluation data source; and
  scraping the potential evaluation data from the at least one identified relevant field of the potential evaluation data source.

12. The method of claim 9, wherein extracting evaluation data information from the retrieved potential evaluation data comprises:
  identifying ranking variables, wherein the ranking variables are stored within a model database;
  identifying the evaluation data;
  generating ranking data corresponding to the ranking variables based on the evaluation data; and
  storing the ranking data.

13. The method of claim 9, wherein the level variances are calculated as one of a variance partition coefficient (VPC) and an intraclass correlation coefficient (ICC), and wherein the most accurate of the simplified model and the second simplified model is selected according to at least one of a Chi-squared likelihood ratio test, an Akaike information criterion (AIC), and a Bayesian information criterion (BIC).

* * * * *